US006333574B1

(12) United States Patent
Clark et al.

(10) Patent No.: US 6,333,574 B1
(45) Date of Patent: Dec. 25, 2001

(54) EMITTER AND POWER DRIVE SYSTEM FOR AN ELECTRONIC LOCK

(75) Inventors: Thomas R. Clark, Lexington, KY (US); Gerald L. Dawson, New Port Richey, FL (US); James P. Redden, Versailles, KY (US)

(73) Assignee: Kaba Mas Corporation, Lexington, KY (US)

( * ) Notice: Subject to any disclaimer, the term of this patent is extended or adjusted under 35 U.S.C. 154(b) by 0 days.

(21) Appl. No.: 09/597,540

(22) Filed: Jun. 19, 2000

Related U.S. Application Data

(62) Division of application No. 08/985,308, filed on Dec. 5, 1997, now Pat. No. 6,076,383.

(60) Provisional application No. 60/033,482, filed on Dec. 19, 1996.

(51) Int. Cl.[7] .............................. H02K 7/00; E05B 49/00

(52) U.S. Cl. ....................... 310/75 R; 310/75 B; 310/78; 70/189

(58) Field of Search ................................ 310/75 R, 75 B, 310/112, 113, 78, 80, 83; 292/144, 201; 74/665 A, 665 B, 665 D, 665 E; 70/189, 275, 277

(56) References Cited

U.S. PATENT DOCUMENTS 3,733,861 * 5/1973 Lester ..................................... 70/153
4,311,331 * 1/1982 Lutz .................................. 292/336.3
4,437,552 * 3/1984 Toyama .................................. 192/26
5,056,633 * 10/1991 Noel ....................................... 192/35
5,493,882 * 2/1996 Jasper ..................................... 70/278

* cited by examiner

*Primary Examiner*—Burton S. Mullins
(74) *Attorney, Agent, or Firm*—Arent Fox Kintner Plotkin & Kahn PLLC; Rustan J. Hill

(57) ABSTRACT

A self powered lock is powered by a manually driven generator. The data input to the lock is entered by rotating the dial and stopping and waiting a predetermined amount of time when a desired number is displayed on the lock display. The drive of the power generator, a stepper motor, is through a unidirectional clutch, such that the generator is only driven when the dial is rotated in a selected direction and remains stationary when the dial is rotated in the opposite direction. The data input, including entry of the combination, to the lock is provided by a stepper motor which generates a train of electrical pulses. The electrical pulses are used by the electronic controls of the lock to control the electronic controls including entering the combination. The data input pulses are generated by a stepper motor driven to act as a generator. The data input generator is similarly driven through a unidirectional clutch and is driven only when the dial is being rotated in a direction opposite the direction in which the power generator is driven. Accordingly, only the power generator or the data input generator is driven at any one time, depending upon the direction of rotation of the dial. A third unidirectional clutch is used to grasp the shaft of the data input stepper motor, preventing the reverse rotation of the rotor when the dial of the lock is rotated to generate operating power.

5 Claims, 5 Drawing Sheets

EMITTER AND POWER DRIVE SYSTEM FOR AN ELECTRONIC LOCK

RELATED APPLICATIONS

This application is a divisional application of U.S. Ser. No. 08/985,308, filed Dec. 5, 1997, now U.S. Pat. No. 6,076,383.

This application claims priority from Provisional Application Serial No. 60/033,482, filed Dec. 19, 1996.

FIELD OF THE INVENTION

This invention relates to a system for powering a self powered lock while providing pulse signals to control the entry of the combination into the lock electronics.

BACKGROUND OF THE INVENTION

Self powered locks have been known for some time. The self powered locks have been of two general types. A first type has been where the power is provided by movement of a member such as a knob or handle which causes generation of power and the entry of the combination by either a key or card carrying a code. The generation of power is separate from the code entry device.

The other type of such self powered lock is exemplified by the lock disclosed in U.S. Pat. No. 5,061,923 issued to Miller et al. In this type lock the same mechanism is used for generation of power for the lock and for the creation of the electronic pulses.

The Miller et al. lock has a permanently engaged drive from a dial to a stepper motor which outputs voltage pulses in both directions of rotations and provides the same pulses to the microprocessor for purposes of entering the combination into the lock or controlling the functions of the lock.

OBJECTS OF THE INVENTION

The object of the invention is to provide an improved powering and combination entry mechanism and drive for an electronic lock.

Another object of the invention is the separation of the power generation function from the data entry or combination function of an electronic lock while maintaining a single operator engagable member.

A further object of the invention is the separation of the power generation function from the data entry function of the electronic lock while requiring only a single motion, dialing.

SUMMARY OF THE INVENTION

An electronic lock is disclosed which has a dial which is rotatable in a first direction to provide power for lock operation. The dial also may be used to enter the combination to open the lock. When the dial is rotated in a clock-wise direction the generator is driven through a one-way clutch such as a sprag clutch or a ball and spider plate clutch. Rotation in the counter clock-wise direction will disengage the clutch and disconnect the drive of the generator.

The rotation of the dial in a counter clock-wise direction not only disengages the clutch driving the generator but also engages a one way clutch which connects to and drives a second stepper motor or pulse generator. The pulse generator is typically a small stepper motor which, due to reduced power generation requirements, does not require a large volume and which may be more easily driven by the operator while providing reliable pulse output. The smaller forces necessary to drive the pulse generator allows finer control of the input of the combination to open the lock and ease of operation.

BEST MODE OF THE PREFERRED EMBODIMENTS OF THE DETAILED DESCRIPTION OF THE INVENTION

Figure 2:
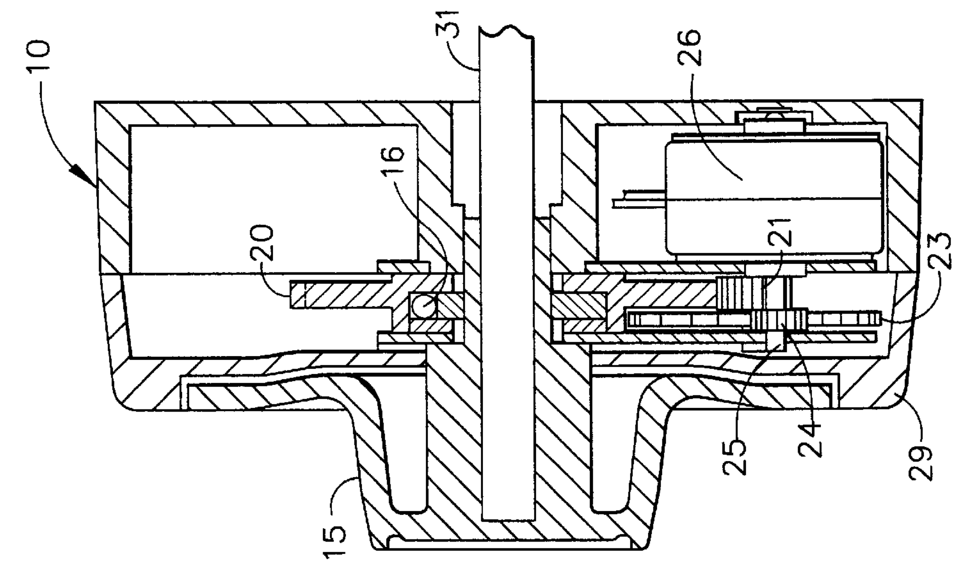
FIG. 2 shows a side view of FIG. 1, including the dial and spindle as well as the generator, gears and clutch assembly.
Figure 1:
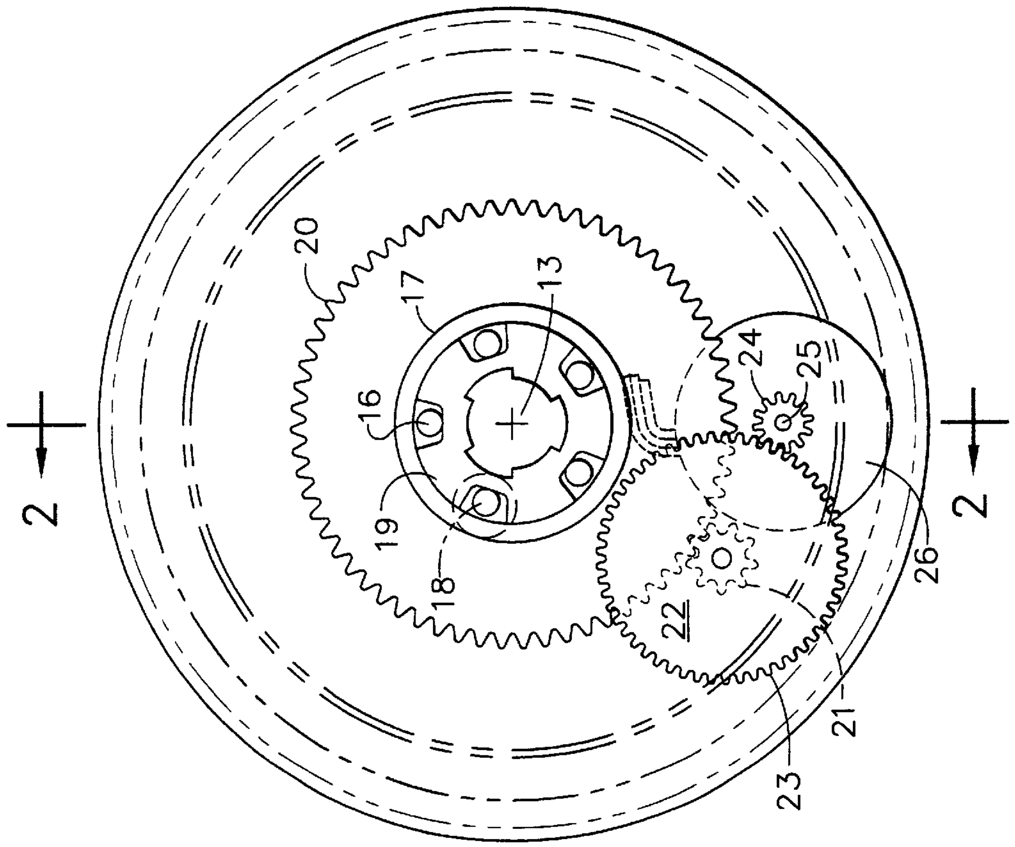
FIG. 1 shows the front view of the dial, dial ring and dial ring cover assembly with the generator, gears and clutch assembly exposed.
Figure 3:
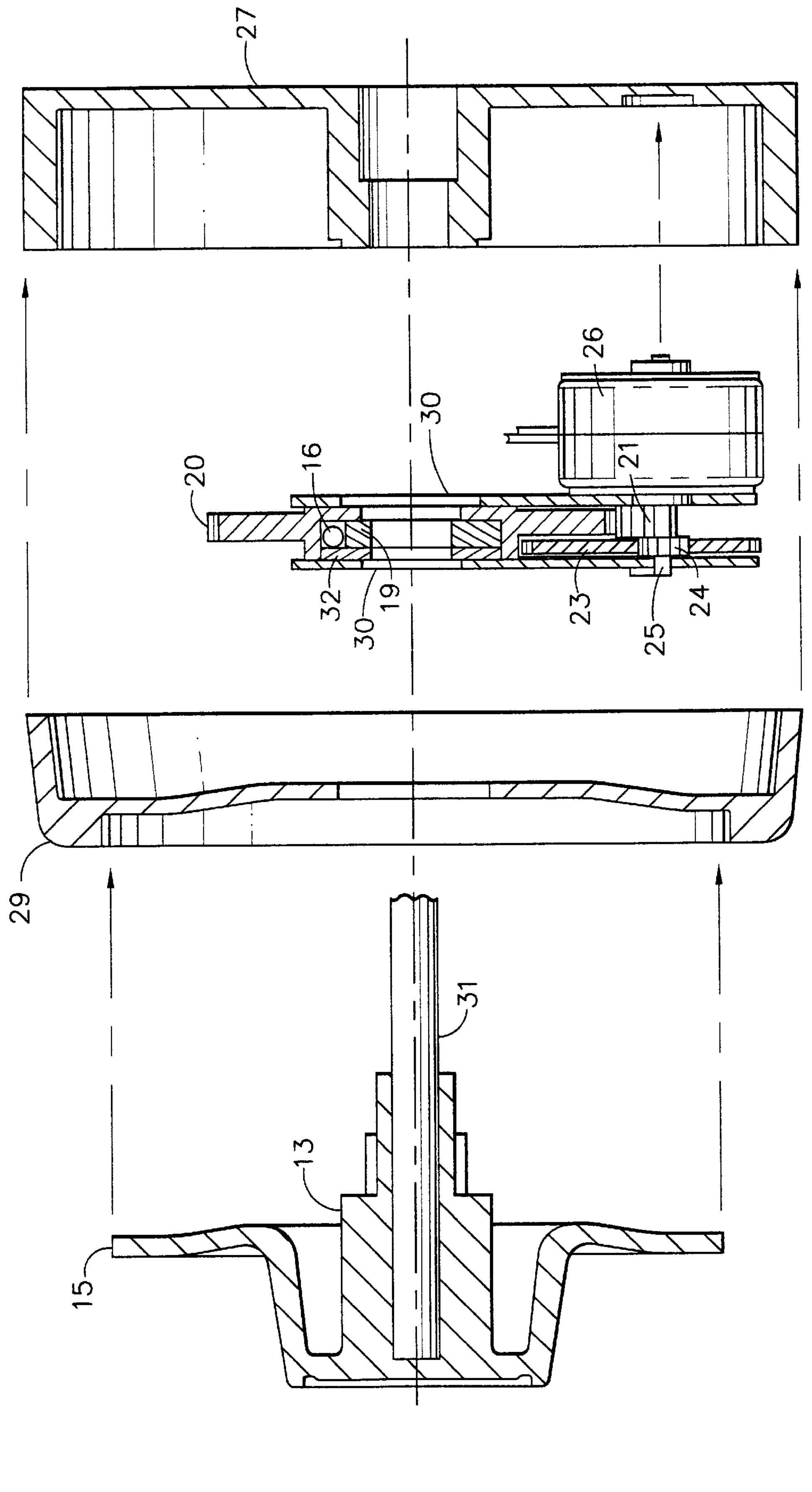
FIG. 3 shows an exploded view of the generator, gears and clutch assembly.

Referring to FIGS. 1, 2 and 3 there is illustrated a dial ring assembly of an electronic combination lock which includes a generator and clutch assembly to provide a drive for generating power for the micro-processor used to control the functions of the electronic combination lock. The lock includes a bolt B (FIG. 4) having an extended locking position and a retracted unlocking position and an electronic control C (FIG. 4) responsive to electric pulses for controlling movement of the bolt between the positions. In the preferred embodiment the clutch 17 engages the generator 26 only when the dial 15 is rotated in the clock-wise direction. This is accomplished with the use of a ball/spider plate clutch or a form of a one way clutch which will only allow the clutch to be engaged when the balls are trapped against the shallower side of the window in the spider plate 19 located in the center of the outer gear assembly. The directions of rotation referred to herein are exemplary and may be reversed is desired. Reversing directions will only involve the reversing of the drive directions of the clutches or unidirectional drives.

When dial 15 is rotated in the clock-wise direction as shown in FIG. 1, the dial 15 engages the spider plate 19 at it's interior surface rotating it in a clock-wise direction by means of the spline 13 on the dial 15 engaged with the mating splines of the spider plate 19. The rotation causes the balls 16 of the spider clutch 17 to translate to the shallow side of the windows 18 in spider plate 19 and be forced to engaged the inner cylindrical surface of the first driver gear 20 causing it to rotate in a clock-wise direction.

The first driver gear 20 is meshed with the first driven gear 21 of the compound gear 22 rotating it in a counter clock-wise direction along with second driver gear 23 which is part of the compound gear 22. The second driver gear 23 is meshed with, and drives the second driven gear 24 fixedly attached to the generator shaft 25 of generator 26 causing the second driven gear 24 and the generator shaft 25 to rotate in a clock-wise direction which in turn generates an A/C voltage and current. The gear train creates a speed step up from the dial 15 to the stepper motor/generator 26. Alternative clutches, such as a unidirectional spring clutch, may be incorporated into the design. Such a spring clutch will be described below.

Mounting plates 30 are used to mount the gear and clutch assembly while plate 32 retains the balls 16 of the spider clutch 17 when assembled.

The Alternating Current electrical voltage generated by the generator 26 is rectified to a Direct Current voltage and, the energy stored in a capacitor and subsequently used to power a micro-processor which in turn, controls the functions of the electronic dial combination lock.

When dial 15 is rotated in the counter clock-wise direction as shown in FIG. 1 the dial 15 rotates the spider plate 19 in a counter clock-wise direction. This allows the balls 16 of spider clutch 17 to rotate to the deep side of the windows 18 allowing them to disengage from the inner diameter of the first driver gear 20.

The disconnection by the clutch drive prevents rotation of the generator 26 and prevents power from being generated when rotating the dial 15 in the counter clock-wise direction. In this preferred embodiment, the above described power generation system would be combined with the emitter/pulse generator system described below to provide a separate power system and a separate emitter system and allow them to function independently based on the direction that the dial of an electronic dial combination lock is being rotated.

Figure 7:
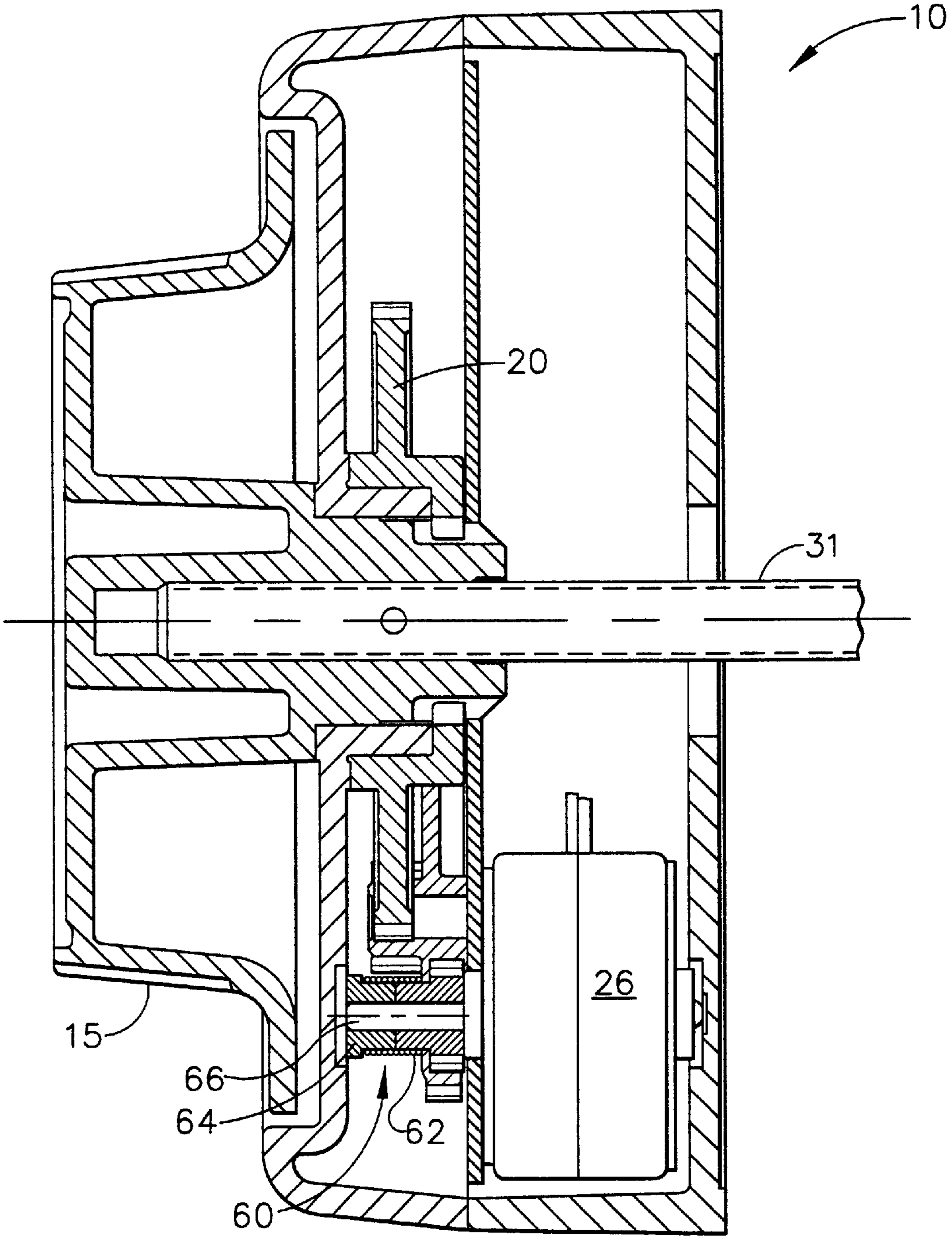
FIG. 7 illustrates a lock using a spring clutch as the unidirectional drive from the dial to the power generator in lieu of the spider clutch illustrated in FIG. 1.

The generator 26 and its associated drive train are resident behind the dial ring 29 and dial 15. The assembled dial ring 29, dial ring housing 27 and dial 15 all are resident on a door or container closure and located on the exterior of the door. A spindle shaft 31 extends through the door to a lock mechanism contained within the lock case assembly 5 to operate the lock 10 and convey the combination values to the microprocessor control of the lock. Referring now to FIG. 7 for an alternative embodiment, the device of FIG. 1 is illustrated with a spring clutch 60. Spring clutch 60 is a conventional spring clutch which has a coiled spring 62 tightenable into arbor 64 in order to grasp the arbor. The rotation of the dial 15 in a clock-wise direction causes the coiled spring 62 to grasp the arbor 64 of the generator drive and the transfer of the rotary drive motion to the generator 26.

The rotation of the dial 15 in a counter clock-wise direction causes the loosening of the coil spring 62 on the arbor 64 and allows slippage between the coil spring 62 and the arbor 64 disconnecting the driving relation of the clutch 60 with the generator 26. The resistance to rotation of the generator shaft 66, supplied by the generator magnetic fields is sufficient to unwrap or loosen the clutch spring 62.

Figure 5:
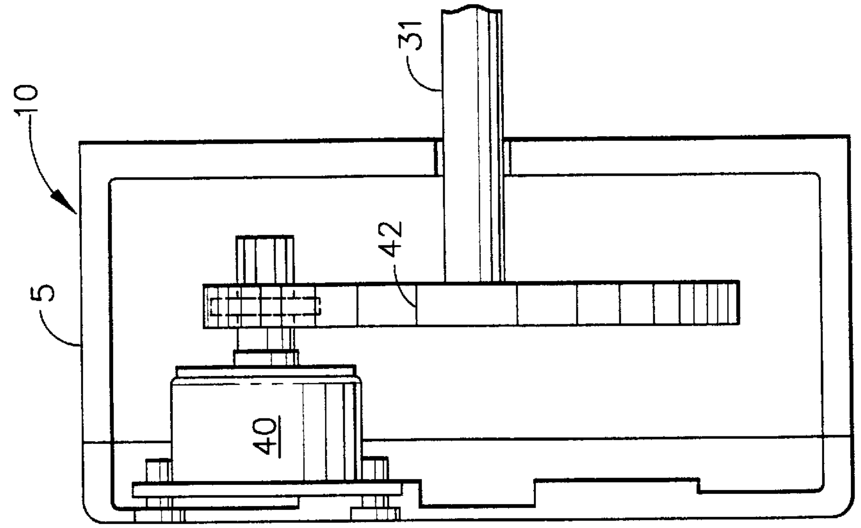
FIG. 5 shows a side view of the drive of FIG. 4.
Figure 4:
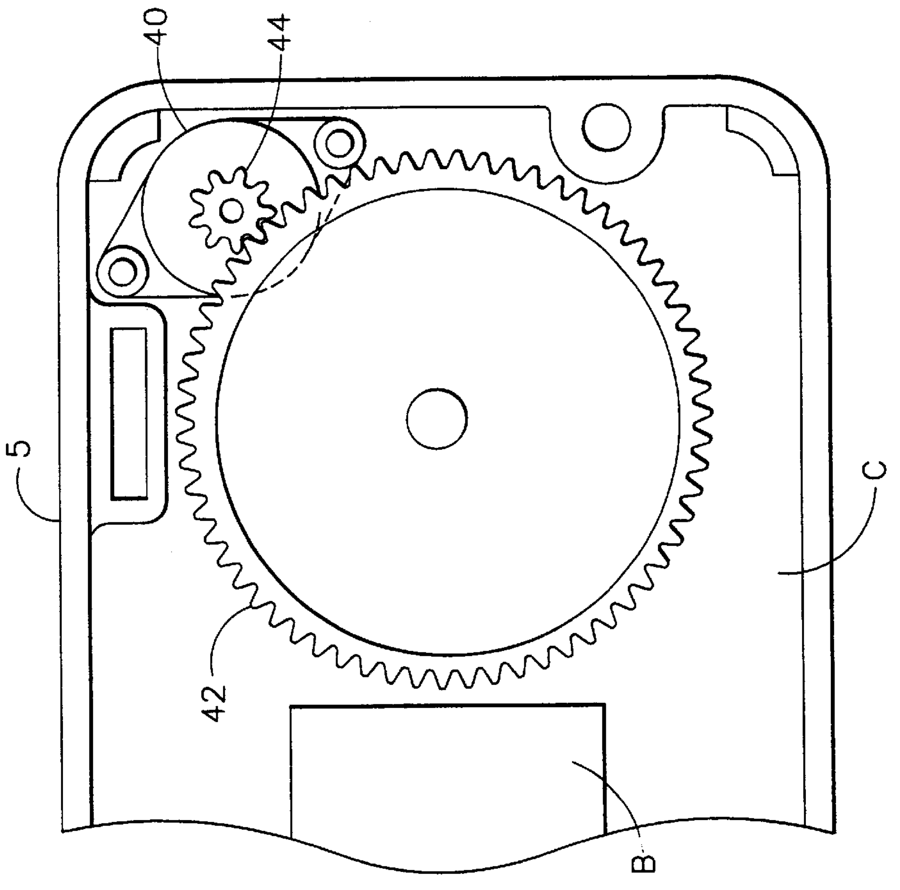
FIG. 4 shows a view of the drive cam/gear assembly interfacing with the stepper motor drive gear and the stepper motor assembly all resident inside the lock case assembly as viewed from the rear of the lock.
Figure 6:
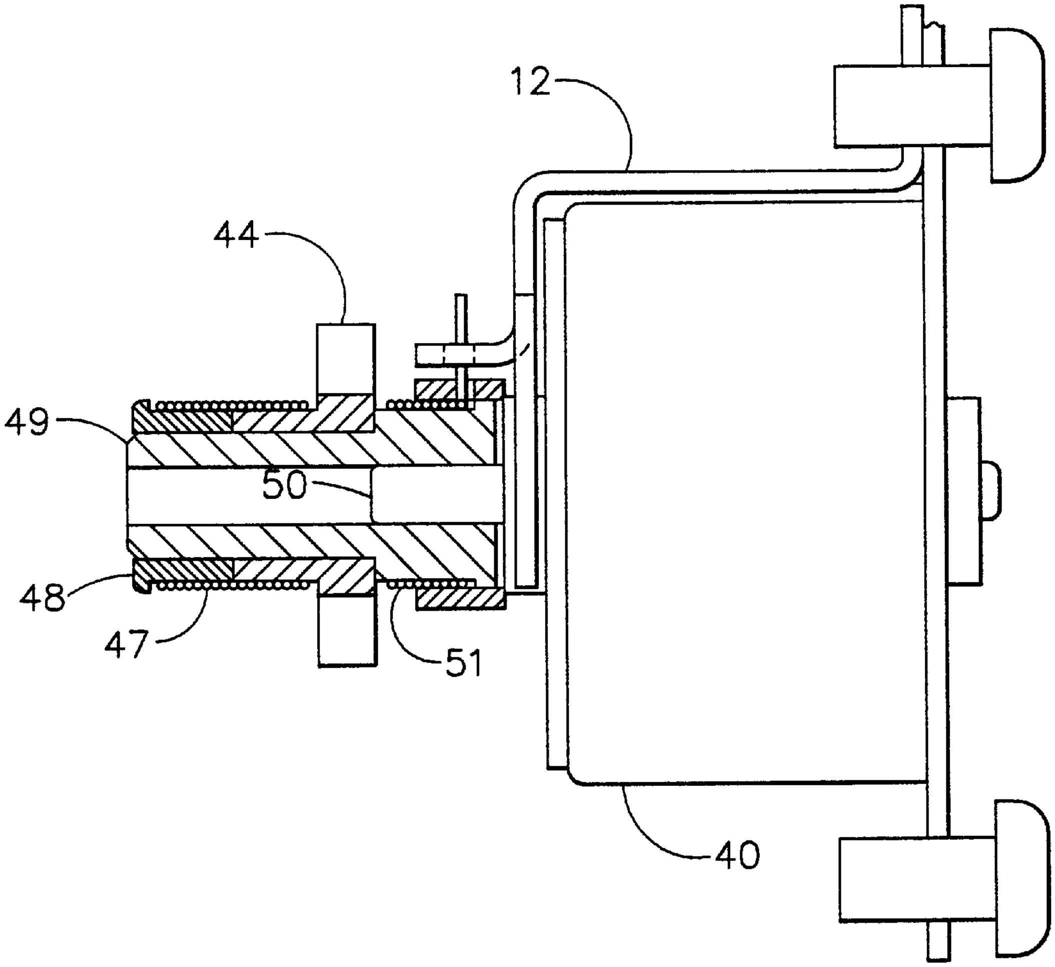
FIG. 6 shows the pulse generating stepper motor assembly of FIG. 4, in a larger view to better illustrate the detail of the mechanism.

Referring now to FIGS. 4–6 there is illustrated an emitter system, also referred to as a pulse generator system for an electronic combination lock 10. The lock 10 is controlled by a micro-processor and utilizes a liquid crystal display (LCD) not shown but similar to the LCD of Miller et al., U.S. Pat. No. 5,061,923, for displaying numbers coinciding to the numbers of the combination as the dial 15 is rotated. In the preferred embodiment the emitter or generator pulses used to convey data to the micro-processor and electronic controls of the lock 10 are only generated when rotating the dial 15 counter-clockwise as viewed from the front on lock 10.

This driving of the pulse generator 40 is accomplished by use of a spring clutch 47 which wraps tightly and only allows the pulse generator 40, which is used to generate emitter pulses, to be driven when rotating dial 15 counter-clockwise. The electrical pulses from the pulse generator 40 are detected by the micro-processor (not shown) and used as control inputs to increment the LCD (not shown) by varying numerical values, the rate of incrementation depending on the rotational speed of dial 15 as determined by the frequency of emitter pulses. When the desired number of the combination is reached, a pause in the pulse input of three seconds, a predetermined time period, for example will register or enter into the lock electronics the currently displayed number as a number in the combination. To achieve this pause the dial 15 must remain stationary or not be rotated in the counter-clockwise direction during combination registration or entry time.

The dial 15 may be rotated clockwise and generate power during this three second period without having any affect on the displayed member because the pulse generator is disconnected. When the displayed number is registered the LCD is blanked or turned off indicating that the operator may again start the dialing sequence counter clock-wise to dial the next number of the combination. The dialing sequence for entering each number will always start at zero or other fixed or predetermined numerical value.

After starting at zero the numbers will increment based on dialing speed and an algorithm that controls the rate of incrementation so that the relationship between the dial position and the numbers being displayed are not related in any way which would allow a casual observer to determine the numbers being dialed based on dial 15 position.

After the final number of the combination is dialed and registered by a second pause and assuming a correct authorized combination has been dialed the microprocessor will display "OP" and a right pointing arrow indicating the operator should rotated the dial 15 right clock-wise) to open the lock 10.

As the dial 15 is rotated in a counter-clockwise direction as viewed in FIG. 1 the drive cam/gear assembly 42 is rotated in the clock-wise direction as viewed in FIG. 4 by means of spindle shaft 31 fixedly attached to dial 15 and drive cam gear assembly 42. This results in the stepped motor drive gear 44 being turned in a counter clock-wise direction.

As shown in FIG. 6 this rotation will in turn cause the spring clutch 47 to tighten and wrap tightly onto the drive arbor 48 which is pressed onto the driven arbor 49 which in turn is pressed on the shaft 50 of the stepper motor 40.

At the same time, spring clutch 51 is partially unwound and slips on the driven arbor 49. This selective drive is achieved by positioning right hand wound spring clutches in opposing directions. When turning the drive cam 42 in a counter clock-wise direction the spring clutch 51 tightens on the driven arbor 49 to prevent rotation of the pulse generator shaft 50 and allows spring clutch 47 to slip on the drive arbor 48 and prevent turning of the stepper motor 40. Bracket 12 is used to retain the end of spring clutch 51 and assist it to tighten on to driven arbor 49 when stepper motor drive gear 44 is turning in a clockwise direction.

The drive gear 44 is free to rotate on arbor 49 and is connected to arbor 49 through arbor 48 by spring clutch 47. This drive train permits the driving of the pulse generator shaft 50 in a counter clock-wise direction and disconnects the drive therefrom when the dial 15 is rotated in the opposite (clock-wise) direction. The clutching function of spring clutch 51 permits rotation of arbor 49 and shaft 50 in one direction (the pulse generating direction) but seizes the arbor preventing shaft 50 rotation in the opposite direction when the dial 15 is rotated in the clock-wise direction to generate electrical power for the lock electronic controls.

We claim:

1. A power generation and data input for an electronic combination lock comprising:

a manually driven electrical power generator;

a manually driven data input generator;

a manually operated drive selectively connectable with said power generator and said data input generator;

a first unidirectional clutch interconnecting said manually operated drive and said power generator;

a second unidirectional clutch interconnecting said manually operated drive and said data input generator;

said first and second unidirectional drives disposed to be selectively engageable responsive to a direction of operation of said manually operated drive.

2. The power generation and data input of claim 1 wherein said first unidirectional clutch is operable to transfer movement of said manually operated drive in a selected first direction to said power generator and operable to disconnect transfer of movement of said manually operated drive to said power generator in a selected second direction.

3. The power generation and data input of claim 1 wherein said second unidirectional clutch is operable to transfer movement of said manually operated drive in a selected second direction to said data input generator and operable to disconnect transfer of movement of said manually operated drive to said data input generator in a selected first direction.

4. The power generation and data input of claim 1 wherein said first unidirectional clutch is operable to transfer movement of said manually operated drive in a selected first direction to said power generator and operable to disconnect transfer of movement of said manually operated drive to said power generator in a selected second direction, and said second unidirectional clutch is operable to transfer movement of said manually operated drive in a selected second direction to said data input generator and operable to disconnect transfer of movement of said manually operated drive to said data input generator in a selected first direction.

5. The power generation and data input of claim 1 further comprising a third unidirectional clutch disposed to prevent rotation of said data input generator in response to rotation of said manually operated drive in said selected first direction.

* * * * *